Figure 1:
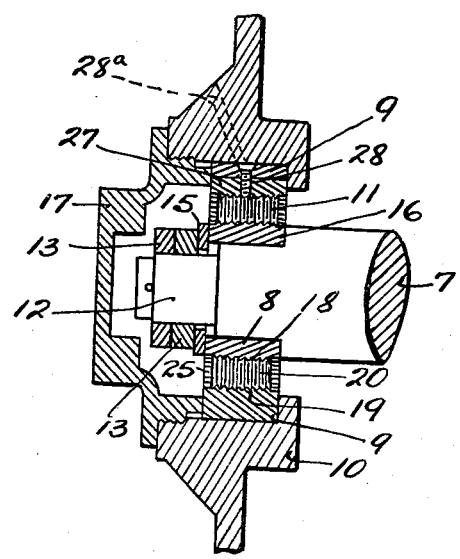

Dec. 23, 1941.  O. S. McCURDY ET AL  2,266,888
ANTIFRICTION BEARING
Filed Aug. 29, 1939  4 Sheets-Sheet 1

INVENTORS
OSCAR S. McCURDY AND
STEWART L. McCURDY
BY
ATTORNEY.

Dec. 23, 1941.   O. S. McCURDY ET AL   2,266,888
ANTIFRICTION BEARING
Filed Aug. 29, 1939   4 Sheets-Sheet 2

INVENTORS
OSCAR S. McCURDY and
STEWART L. McCURDY
BY
ATTORNEY

Dec. 23, 1941.   O. S. McCURDY ET AL   2,266,888
ANTIFRICTION BEARING
Filed Aug. 29, 1939   4 Sheets-Sheet 3

INVENTORS
OSCAR S. McCURDY and
STEWART L. McCURDY
BY
ATTORNEY.

Dec. 23, 1941.    O. S. McCURDY ET AL    2,266,888
ANTIFRICTION BEARING
Filed Aug. 29, 1939    4 Sheets-Sheet 4
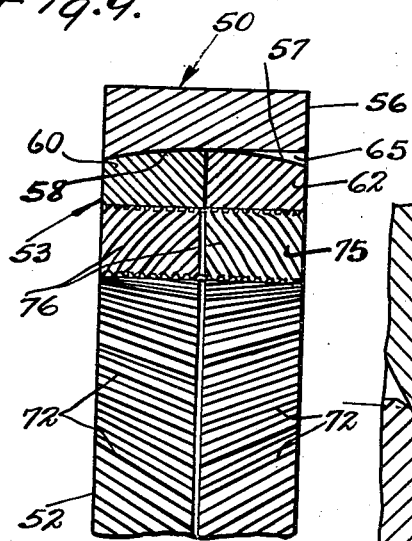
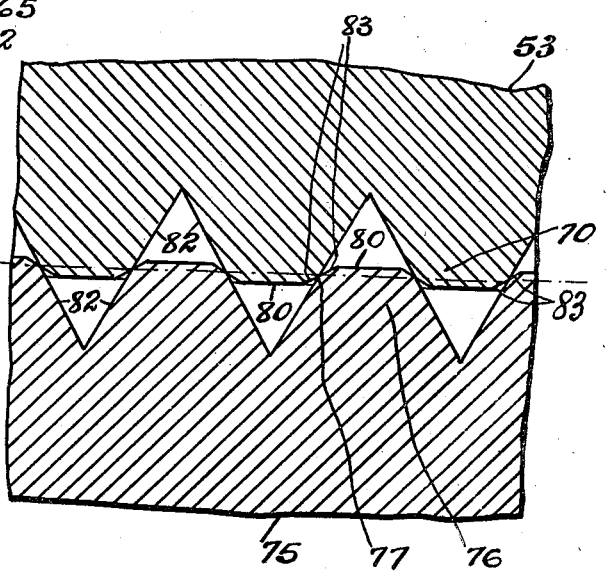
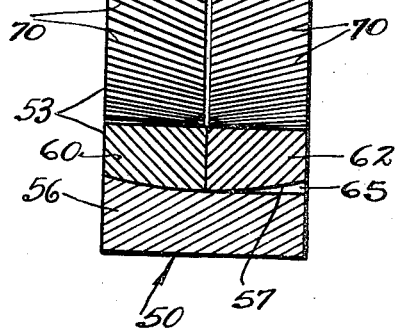
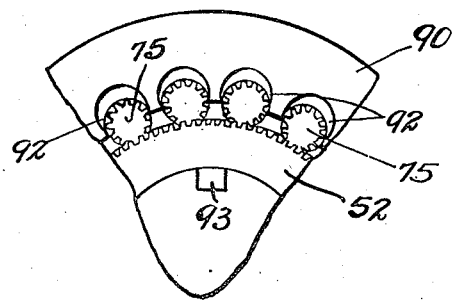
INVENTORS
OSCAR S. McCURDY AND
STEWART L. McCURDY
BY
ATTORNEY Patented Dec. 23, 1941

2,266,888

UNITED STATES PATENT OFFICE 2,266,888

ANTIFRICTION BEARING

Oscar S. McCurdy and Stewart L. McCurdy, Pittsburgh, Pa.

Application August 29, 1939, Serial No. 292,422

12 Claims. (Cl. 308—213)

This invention relates to anti-friction bearings, such as roller and ball bearings, and it has for its primary object the provision of bearings of this type, in which frictional resistance is materially reduced, as compared with the conventional types of bearings, and in which substantially all sliding or frictional action is obviated.

Another object of the invention is to provide a practical type of bearing of the kind specified, in which any requirement for cages is obviated by the inclusion of means for maintaining the balls or rollers spaced and held against axial movement and without sliding or friction.

Further objects include the provision of a bearing having increased efficiency, less tendency to heat, longer life and lower maintenance cost than roller bearings of the type heretofore known.

The invention also includes the provision of an improved mounting for the roller bearings.

Figure 4:
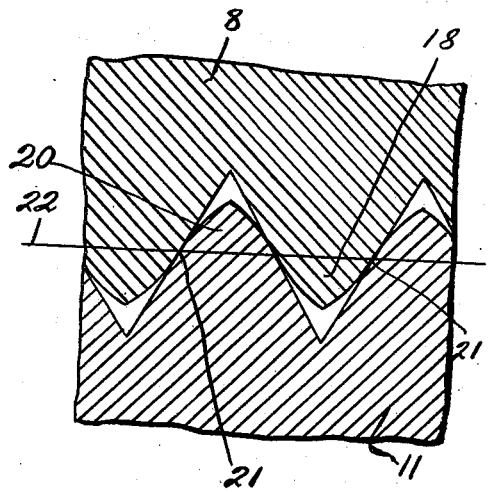
Figure 2:
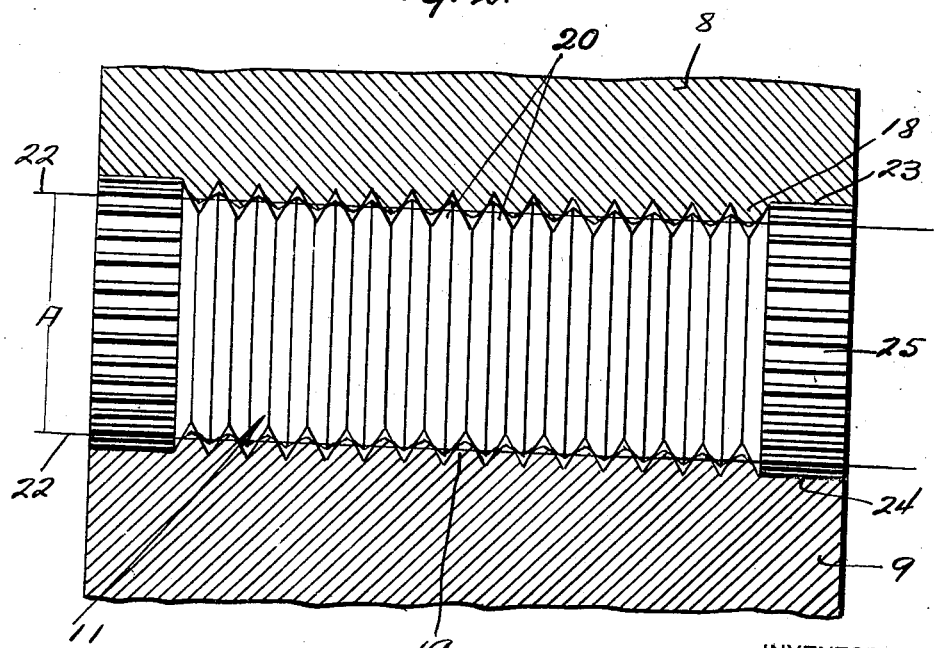
Figure 3:
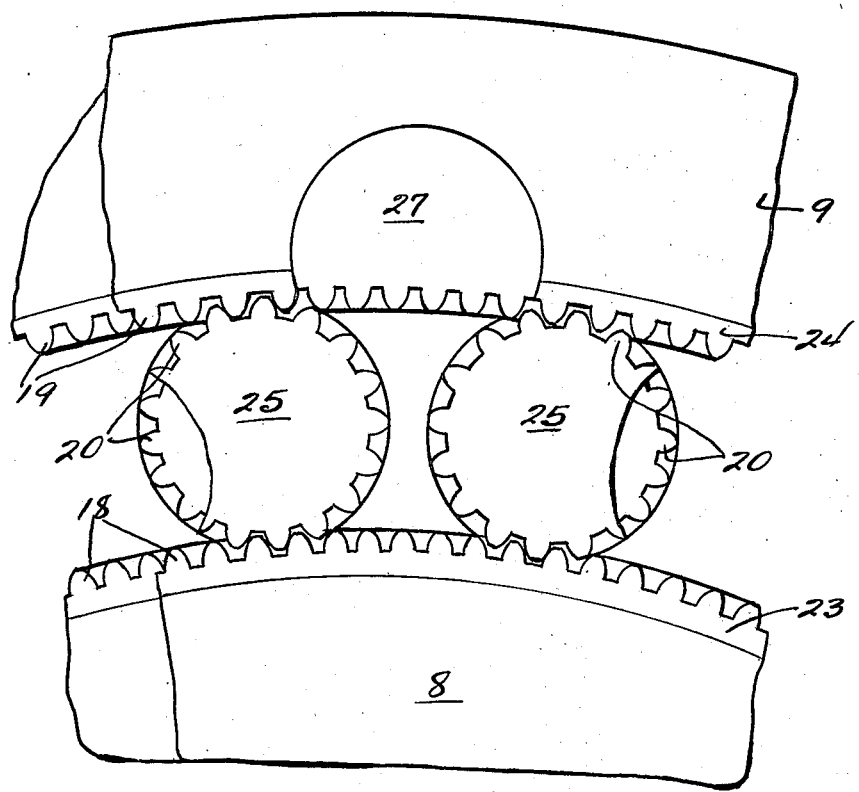
Figure 5:
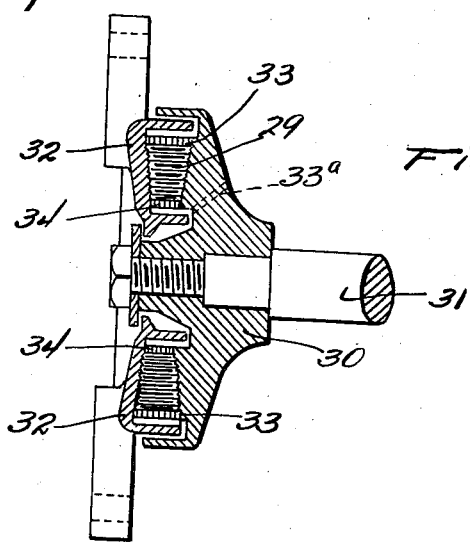
Figure 6:
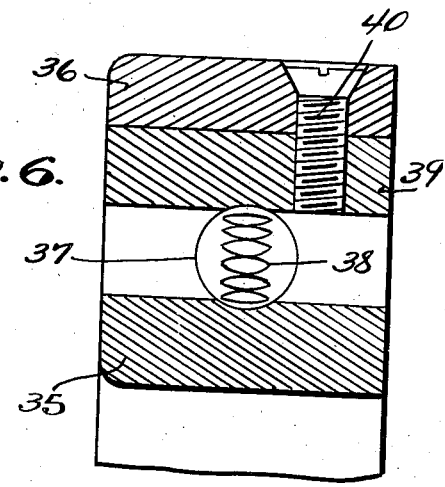
Figure 8:
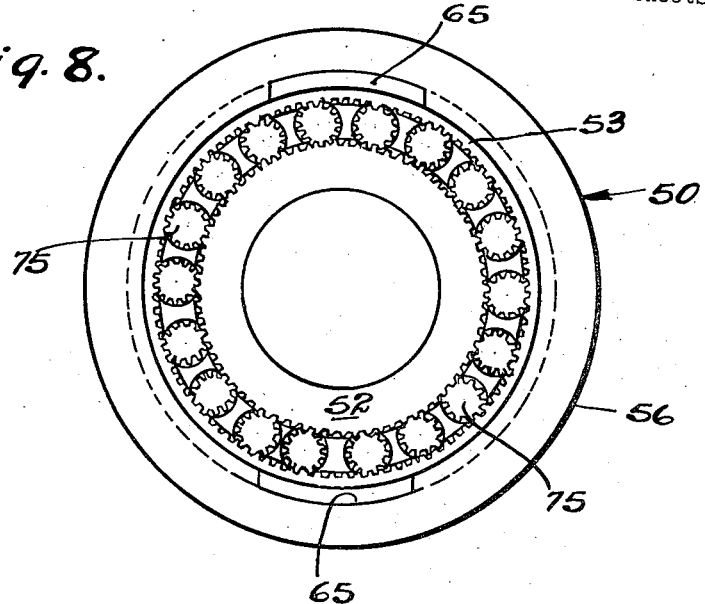
Figure 7:
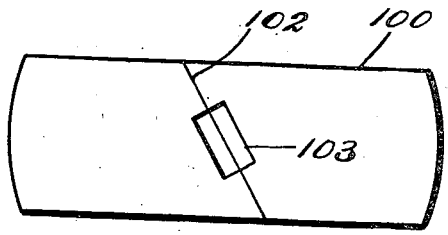
Figure 11:
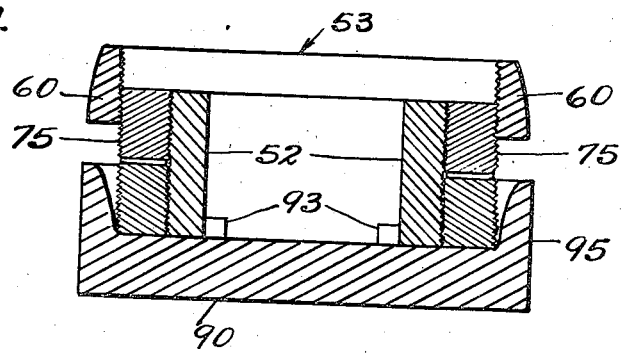

In the drawings:

Fig. 1 is a cross section along a plane containing the major axis of one form of bearing; Fig. 2 is a fragmentary cross section, on a larger scale, showing in detail one construction of a roller element; Fig. 3 is a fragmentary end elevation of rollers and races therefor; Fig. 4 is a fragmentary longitudinal section, on a larger scale, showing in detail roller corrugations and corrugations of one of the coacting races; Fig. 5 is a vertical section of a thrust bearing construction embodying another application of the invention; Fig. 6 is a cross section of a bearing construction embodying still another application of the invention; Fig. 7 is a plan of another form of outer race member; Fig. 8 is a side elevation of another form of roller bearing construction; Fig. 9 is a fragmentary cross section, on a larger scale, and partially in elevation of the structure shown in Fig. 8; Fig. 10 is a fragmentary longitudinal section showing in detail the relation of roller and race teeth or gears; Fig. 11 is a cross section of a roller bearing structure, together with an assembling device; and Fig. 12 is fragmentary plan of the structure shown in Fig. 11.

In practicing the invention, a shaft 7 is provided on which a journal 8 is shrunk, or otherwise suitably secured, and 9 is a journal box suitably secured in a supporting frame member 10. Between the journal and box are a series of anti-friction rollers 11 of novel construction, as later described. The end of the shaft is threaded, as indicated at 12, and carries nuts 13 which clamp a washer 15 against the end of the journal to maintain it securely in proper position against a shoulder 16 of the shaft. A screw cap 17 engages the frame member and serves as a cover for the outer side of the bearing and shaft end.

The journal 8 has an outer circumferential section provided throughout its length with a series of circumferentially arranged corrugations 18, and the box 9 is similarly provided with an inner circumferential section in the form of bearing corrugations 19 matching in opposed relation those of the journal. Each roller 11 is also provided with circumferential corrugations 20, similar to the corrugations 18 and 19, and interfitting therewith, as best shown in Fig. 2. The side surfaces of the corrugations are convex, as indicated in Fig. 4, so that opposing corrugations are out of contact except at the points 21 lying on the pitch lines 22 (Figs. 2 and 4) and the effective roller diameter is the distance A between these lines (Fig. 2). Since the corrugations 18 and 19 are formed with the curved sides, they contact only at the points 21 and thus serve to obviate sliding action or friction which would otherwise be present between the engaging corrugations if they contacted along lines extending from their bases to their peaks.

The journal 8 is provided at each end with an external spur gear 23 (Figs. 2 and 3) and the box 9 is similarly provided at each end with an internal spur gear 24. The rollers 11 are also each provided at each end with a spur gear 25, and these latter gears mesh with the gears 23 and 24 on the journal and box, respectively. The pitch diameter of the gears 25 is necessarily equal to the distance A, which is the effective rolling diameter of the roller as heretofore pointed out, as otherwise, the bearing surfaces of the rollers would be caused to slide a slight amount relative to the bearing surfaces of the journal and box and thus increase the friction and the wear.

The gear teeth are preferably abbreviated inside and outside the pitch circles, so as to insure contact at the pitch lines and not beyond them, and, as indicated in Fig. 3, the teeth are staggered at the two ends of the bearing to provide a double number of contacts in one revolution, thus making the abbreviation of the teeth more practical.

The use of the spur gears 25, as above described, provides for the maintenance of the rollers in properly spaced relation circumferentially of the race, while the circumferential corrugations prevent any endwise movement of the rollers. It is thus possible to dispense with the usual cages for accomplishing the functions above stated, and all sliding or friction incidental to the use of cages and spacers is obviated. Friction losses and wear are, therefore, reduced and the efficiency of the bearing increased. Since cages are not necessary in this improved construction, the rollers can be placed closer together than would otherwise be the case and thus a greater number of them can be used in the race. The corrugations and gears on the rollers may be produced, at the same time, by knurling at a low cost and with accuracy, thus providing hard rolled surfaces.

The rolling action of the circumferentially corrugated rollers of this improved construction is no greater than that of standard cylinder rollers, and the rollers are somewhat more resistant to fracture in service because of the modified distribution of strain incidental to the wedge action of the corrugations upon one another.

Provision is made for the insertion of the rollers into the race by the use of a tapering opening 26 (Fig. 3) in the box, which opening is filled by the tapering plug 27 (Figs. 1 and 3) after the assembly is completed, such plug being held in place by the screw 28. The opening is just large enough to permit the rollers to be inserted when the pin is removed. The tapering of the opening and the plug serves to insure proper assembly with a tight fit, the formation of the corrugations on the inner side of the plug being done with the pin in position and, at the same time, the bearing surface of the box is corrugated. The taper on the plug also serves to provide oblique lines of separation between the plug and the race, thus providing for only one of the point contacts of the corrugations to pass over the line of junction at any one time and preventing a hammering action tending to injure the rolling bearing points. The plug might be located in the journal instead of the box, but is preferably in the box, as shown, and on the side which does not support the load in order to reduce the wear thereon. Oil may be supplied to the bearing through the feed passage 28a (Fig. 1).

Fig. 5 illustrates the application of the invention to a thrust bearing, in which tapering rollers 29 are used. In this case, the part 30 on the shaft 31 is, broadly considered, the journal and 32 is the box. The rollers are provided at their ends with the spur gears 33 and 34 which mesh with gears on the members 30 and 32. Provision is made for supplying oil through the passage 33a.

Fig. 6 shows the application of the invention to a ball bearing for handling light loads, the part 35 being the journal in this case, and 36 represents the box. The balls 37 are provided with corrugations 38 which, in this case, extend longitudinally of the axis of rotation of the journal and engage suitably corrugated bearing surfaces on the members 35 and 36. The section shown is taken at the assembly point of the bearing, so that the tapering plug 39 which normally closes the opening, is shown, such plug being held against longitudinal movement by the screw 40. It will be noted that in this structure, as in the structures previously described, the design avoids any requirement for a cage or for spacers. The balls are maintained in properly spaced relation by the corrugations and are held against movement longitudinally of the axis of the journal by the interfitting of the balls in their races.

We are aware that it is not broadly new to employ gears on roller bearings for spacing purposes and that interfitting circumferential ribs and grooves have been employed in connection with rollers and their races to prevent endwise movement of the rollers, but in such structures, as heretofore proposed, the bearing load is taken by the smooth cylindrical surfaces of the rollers as opposed to our construction in which the entire load is carried on the corrugations of the rollers with point contact to avoid sliding or friction. The invention is capable of embodiment in various designs other than those shown in Figs. 4 to 6 and involving modifications of the character of the gear corrugations and bearing teeth or ribs, the basic departure here being the replacement of the smooth or cylindrical bearing surfaces heretofore used by bearing corrugations or ribs with interspersed recesses extending throughout the bearing area and carrying the load with a rolling contact, as opposed to frictional contact.

The constructions and definitions set forth with reference to Figs. 1 to 6, inclusive, are substantially reproduced herein from our co-pending application Serial No. 207,654, filed May 13, 1938, and the specifications and drawings herein presented are intended to be substituted for such co-pending application, as well as to include additional substance described in detail below.

Referring to Figs. 7 to 12, inclusive, there is provided a bearing construction 50 which includes inner and outer race members 52 and 53 of substantially annular form and arranged in concentric relation. A box 56 is mounted around the outer periphery of the outer race member 53, the latter of which has a substantially spherical convex surface 57 which is complemental to and fits in an inner concave spherical surface 58 formed in the box 56. The outer race member 53 is sectional and is in the form of a pair of rings 60 and 62 which fit together in side by side relation and are held against lateral separation by virtue of the fitting of the spherical surface 57 into the concave surface 58 of the box.

A portion of the box 56 is cut away, as indicated at 65, along lines substantially parallel to the axis of the bearing to a depth corresponding to the maximum depth of the concave spherical surface 58, and at diametrically opposed circumferential portions of the race receiving box 56. These cut away portions receive the assembled sectional race member 52 laterally therein until it is substantially centered, and then, by turning the race member until it is substantially coaxial with the box, it will remain firmly held against axial displacement relative to the box. The interfitting spherical surfaces 57 and 58 provide for automatic shaft alignment, or in effect, provide a universal joint. The bearing is thus self aligning.

Each section of the outer race member 53 is provided with an inner row of bearing elements in the form of ribs 70. Corresponding teeth of each row are inclined toward a central portion or dividing line of the race periphery and provide a herring bone type of bearing elements. The outer peripheral portion of the inner race 52 is also provided with continuous rows of bearing elements 72 of herring bone type that are disposed in spaced relation to the bearing elements of the outer race member. Rollers 75 of substantially cylindrical outline are disposed in evenly spaced relation between the race members 52 and 53, and each roller is formed with helical teeth or bearing elements 76 disposed in opposed relation from a central portion of the roller outwardly toward its end. The bearing elements 76 are complemental to the herring bone bearing elements of the inner and outer race members and interfit therewith in a plurality of spaced point contacts, as indicated at 77 (Fig. 10). There is thus provided a rolling point contact between each bearing element of the roller and a corresponding bearing element of the race members.

Each bearing element is somewhat truncated in cross-sectional contour (Fig. 10) to form a cylindrical surface portion 80 to which the inclined sides 82 of the bearing elements lead, the surface portions and sides forming corners or contact areas which are slightly reduced, as indicated at 83, and are finished to provide wear resisting areas, as well as having maximum smoothness.

Since the bearing elements are helical, the forces exerted in relatively rotating the race members involve two sets of components acting at the points 77, one set of which maintains a definite bearing relation circumferentially of the bearing to insure constant spacing among the several rollers. The other set of components acts axially of the rollers to prevent axial displacement thereof. Thus the relative point contact between the bearing elements of the rollers and the bearing elements of the two race members remains constant, and the bearing elements are so fitted that the relative positions of the several rollers in their movement between the race members are always the same. It is to be understood that the finished contact areas indicated at 83 may overlap slightly without materially affecting the desirable character of the substantially point contact relation, and the latter definition is intended to include localized contact in which friction is substantially obviated, although the contact may not in all cases be precisely and mathematically at a point.

In one construction for assembling the inner and outer race members 52 and 53 with the rollers, a rack 90 is provided with a series of outwardly flaring recesses 92, the latter of which are arranged in an annular row corresponding to the relative positions of the rollers in the bearing construction 50, and the inner race member 52 is centered thereon by means of centering lugs 93, as shown on the face of the rack in Fig. 12. The rack is so constructed that its outer wall 95 extends only half the distance of the width of the inner race member 52, (Fig. 11), or in other words, the distance of half the length of one of the rollers. After the inner race member is centered on the rack and the roller members 75 are inserted, as indicated in Figs. 11 and 12, the section 60 of the sectional race member 53 is fitted over the rollers with the bearing elements properly interfitting therewith. The rack is then removed and the other section 62 of the outer race member is applied in side by side relation to the section 60. The assembled race members and rollers are then ready for assembly in the box 56 in the manner specified above.

An outer race member 100 can also be in the form of a split ring in which a split 102 is formed diagonally of the peripheral length of the ring in order that the rollers will progressively traverse the split portion, and thus facilitate roller action. This ring can be recessed at the split, as indicated at 103, for the purpose of facilitating the insertion of a conventional tool employed in spreading the ring to receive the rollers. This form of split ring or race is applicable to the type of race member or journal box 9 shown in Figs. 1 to 6, or to the type of race member 53 shown in Fig. 9, either sectional or in unitary form.

Although several constructions to which the concept of invention is applicable have been shown and described in detail, it will be apparent to those skilled in the art that the invention is not so limited, but that various changes can be made therein without departing from the spirit of the invention or from the scope of the appended claims.

We claim:

1. In combination in an anti-friction bearing, a journal having its bearing area provided throughout the length thereof with circumferential corrugations, an opposing box having its bearing surface similarly provided throughout its length with corrugations matching those of the journal, a series of rollers in spaced relation between the two bearing surfaces provided over their bearing lengths with circumferential corrugations similar to those on the bearing surfaces of the journal and box and interfitting in load carrying relation therewith, said circumferential corrugations on the rollers and on the journal and the box having their side surfaces of convex contour and providing a restricted area of contact between opposing corrugations at points intermediate the tops and bases of said corrugations, and means for maintaining the rollers in spaced relation including a gear on each end of the rollers and gears on the journal and box, respectively, at each end thereof with which the gears on the rollers engage.

2. In combination in an anti-friction bearing, a journal having its bearing area provided throughout the length thereof with circumferential corrugations, an opposing box having its bearing surface similarly provided throughout its length with corrugations matching those of the journal, a series of rollers in spaced relation between the two bearing surfaces provided over their bearing lengths with circumferential corrugations similar to those on the bearing surfaces of the journal and box and interfitting in load carrying relation therewith, said circumferential corrugations on the rollers and on the journal and the box having their side surfaces of convex contour and providing a restricted area of contact between opposing corrugations at points intermediate the tops and bases of such corrugations, and means for maintaining the rollers in spaced relation including a gear on each end of the rollers and gears on the journal and box, respectively, at each end thereof with which the gears on the rollers engage, the pitch diameter of the gears on the rollers being the same as the transverse distance through the rollers from the contact points on one side thereof to the contact points on the other side thereof.

3. In combination in an anti-friction bearing, a journal having its bearing area provided throughout the length thereof with circumferential corrugations, an opposing box having its bearing surface similarly provided throughout its length with corrugations matching those of the journal, a series of rollers in spaced relation between the two bearing surfaces provided over their bearing lengths with circumferential corrugations similar to those on the bearing surfaces of the journal and box and interfitting in load carrying relation therewith, means for maintaining the rollers in spaced relation including a spur gear on each end of each roller and spur gears on the journal and box, respectively, at each end thereof with which the spur gears on the rollers engage, a recess in the wall of the box longitudinally of the axis of the journal to permit the insertion of the rollers in assembling the bearing, a plug fitting in said recess with its inner face provided with corrugations corresponding to those on the box, and means for securing the plug in position.

4. In combination in an anti-friction bearing, a journal having its bearing area provided throughout the length thereof with circumferential corrugations, an opposing box having its bearing surface similarly provided throughout its length with corrugations matching those of the journal, a series of rollers in spaced relation between the two bearing surfaces provided over their bearing lengths with circumferential corrugations similar to those on the bearing surfaces of the journal and box and interfitting in load carrying relation therewith, means for maintaining the rollers in spaced relation including a spur gear on each end of each roller and spur gears on the journal and box, respectively, at each end thereof with which the spur gears on the rollers engage, the box wall having a tapering recess therein longitudinally of the axis of the journal to permit the insertion of the rollers in assembling the bearing, a tapering plug fitting said recess with its inner face provided with corrugations corresponding with those on the box, and means for securing the plug in position.

5. In combination in an anti-friction bearing, a journal member provided circumferentially with corrugations, an opposing box member provided with similar corrugations matching those of the journal member, a series of rollers in spaced relation between the journal and box members provided with corrugations meshing in load carrying relation with those of the journal and box members and holding the rollers against axial movement, one of said members having a recess in the wall thereof and longitudinally thereof to permit the insertion of the rollers in assembling the bearing, a plug fitting said recess with its inner face provided with corrugations corresponding with those of the member in which it is mounted, and means for securing the plug in position.

6. In combination in an anti-friction bearing, a journal member provided circumferentially with corrugations, an opposing box member provided with similar corrugations matching those of the journal member, a series of rollers in spaced relation between the journal and box members provided with corrugations which mesh in load carrying relation with those of the journal and box members and prevent movement of the rollers longitudinally of the axis of the journal members, one of said members having a recess disposed longitudinally in the wall thereof to permit the insertion of the rollers in assembling the bearing, a plug fitting said recess with its inner face provided with corrugations corresponding with those of the member in which it is mounted, and means for securing the plug in position, said recess and plug being similarly tapered longitudinally thereof.

7. In an anti-friction bearing, a journal having corrugations along its circumferential bearing area, an opposing annular race member having similar corrugations along its inner periphery and having a substantially spherical outer surface, a series of rollers disposed in circumferentially spaced relation between the opposing corrugations of the journal and race member and having corrugations formed circumferentially thereon interfitting in load carrying relation with the opposing corrugations of the journal and race member, said circumferential corrugations on the rollers and on the journal and race member having their side surfaces of convex contour and providing a restricted area of contact between opposing corrugations at points intermediate the extremities and bases of said corrugations, said race member being split to permit spreading and insertion of the rollers between its inner surface and the journal, and a box surrounding the outer race member and having an inner substantially spherical surface complemental to the outer spherical surface of the race member, said box having cut away portions of a depth corresponding substantially to the maximum depth of the inner spherical surface whereby the outer race member is insertable laterally through the cut away portions and turnable into axial alignment with the box to be held against axial movement with respect to said box.

8. In an anti-friction bearing construction, inner and outer relatively rotatable race members having roller bearings between them, the outer race member having a substantially spherical surface and being split diagonally of its periphery to permit spreading and insertion of the roller bearings therein in operative relation to the inner race member, a box surrounding the outer race member and having an inner substantially spherical surface complemental to said outer spherical surface and receiving the latter, said box having a cut away portion on each side of its axis and of a depth corresponding substantially to the maximum depth of the inner spherical surface, whereby the outer race member is insertable laterally through the cut away portions and turnable into axial alignment with the box to be held against axial movement with respect to said box.

9. In combination in an anti-friction bearing, a journal having a series of ribs running circumferentially around its bearing area throughout the bearing length thereof, an opposing journal box having a series of ribs matching those of the journal and running circumferentially around the bearing area of said box, a series of spaced rollers disposed between the two ribbed bearing areas and each roller having ribs running circumferentially around its bearing area and interfitting in radial load-carrying relation with the bearing ribs of the journal and box, said ribs on the rollers and on the journal and box having their side surfaces of convex contour and providing substantially point contact bearing on opposite sides of each of the opposing ribs at points intermediate the tops and bases of said ribs.

10. Anti-friction bearing construction comprising inner and outer relatively rotatable race members, and bearing rollers supported solely by circumferential engagement upon the bearing area of said races and spacing the latter in radial load carrying relation, the bearing area of each roller constituting oppositely formed helical ribs disposed thereon from an intermediate portion outwardly toward the opposite ends thereof, the bearing area of each of said race members constituting two rows of helical bearing ribs interfitting respectively with oppositely disposed helical ribs of each roller, each rib of the bearing rollers having opposite convex bearing sides engaging only in point contact with similar sides of adjacent bearing ribs of a race member to provide a substantially non-frictional rolling and radial bearing relation.

11. An anti-friction bearing construction comprising inner and outer relatively rotatable race members having opposed bearing surfaces, and bearing rollers supported solely by radial bearing and circumferential engagement upon the bearing surfaces of said race members and carrying bearing loads radially of said race members, the bearing surfaces of said race members and said rollers including complemental intermeshing bearing elements, each bearing element of the rollers having opposite side portions engageable in point contact with complemental bearing elements of both race members, the bearing relation of each point contact defining two components resulting from substantially radially applied bearing loads, said components resisting any tendency of the roller members to shift axially and the other of said components resisting any tendency of the spaced roller members to alter their degree of relative spacing circumferentially along the space between the race members.

12. In an anti-friction bearing construction, inner and outer relatively rotatable race members, one of said race members being sectional in the form of two side by side annuli and having oppositely inclined and converging bearing ribs forming a herring bone type of bearing construction when assembled, the other of said race members having an opposing herring bone type of bearing construction, and roller elements supported solely by radial bearing and circumferential engagement upon the bearing elements of said race members and spacing the inner and outer race members, each roller member having opposite end portions formed with bearing ribs of herring bone type complemental to the opposed herring bone construction of the inner and outer race members and interfitting therewith to maintain the roller elements against axial displacement and in constant spaced relation.

OSCAR S. McCURDY.
STEWART L. McCURDY